UNITED STATES PATENT OFFICE.

JEAN ALTWEGG, OF ST. FONS, FRANCE, ASSIGNOR TO SOCIÉTÉ CHIMIQUE DES USINES DU RHONE ANCIENNEMENT GILLIARD P. MONNET ET CARTIER, OF PARIS, FRANCE.

PROCESS FOR THE PREPARATION OF PRIMARY ALCOHOLS.

1,315,619.     Specification of Letters Patent.    Patented Sept. 9, 1919.

No Drawing.    Application filed February 11, 1919. Serial No. 276,388.

*To all whom it may concern:*

Be it known that I, JEAN ALTWEGG, a citizen of the Swiss Republic, residing at St. Fons, Department of Rhone, France, have invented a certain new and useful Process for the Preparation of Primary Alcohols, of which the following is a specification.

This invention consists in a process for the preparation of the primary alcohols in which the oxid of ethylene in a gaseous condition is caused to react upon the mixed organic magnesium combinations coming under the formula R.Mg.halogen.

It is known that primary alcohols can be obtained by the action of an ethereal solution of oxid of ethylene, cooled to minus 15° C. upon the mixed organic magnesium combinations referred to above. But it has not heretofore been possible to practically apply this reaction owing to the unmanageable nature of oxid of ethylene.

I have discovered that the oxid of ethylene readily lends itself to the practical synthesis of the primary alcohols provided the said oxid is caused to react in a gaseous form.

In carrying out the invention it is sufficient to introduce a current of dry gaseous oxid of ethylene into the organic magnesium combination in order to obtain an additional product which by hydrolysis gives the corresponding primary alcohol with excellent yields.

This new method of synthesis of primary alcohols offers a marked advantage relatively to the method described in French Patent No. 348957 dated 10th November, 1904, in this respect, that it enables the alcohols to be obtained with half the quantity of organic magnesium combination.

*Example I. Primary phenyl-ethylic alcohol.*—The ethereal solution of one molecule of phenyl bromid of magnesium is cooled to a temperature of 0° C. and into it is introduced one molecule of dry oxid of ethylene in a moderate current.

The gas is easily absorbed by the magnesium combination at the same time giving off little heat. By any suitable cooling means the temperature is maintained at about 10° C. and when all the oxid of ethylene is absorbed 200 cubic centimeters of dry benzene are added; the ether is then evaporated by heating in a boiling water bath. After cooling some dilute sulfuric acid is added and the phenyl-ethylic alcohol formed is separated by decantation from the benzene solution and purified by rectification. In this manner there is obtained, with a yield approximating to theory, phenyl-thylic alcohol distilling at 89° C. at a pressure of 4 millimeters.

*Example II. Primary p-cresyl-ethylic alcohol.*—By replacing, in Example I, the phenyl bromid of magnesium by the p-cresyl-bromid of magnesium, p-cresyl-B-ethanol is obtained in the same manner, with a very good yield. The boiling point of this product is 98° C. at a pressure of 3 millimeters.

*Example III. Primary p-metoxy-phenyl-ethylic alcohol.*—A current of gaseous ethylene oxid is passed into the combination of one molecule of p-bromanisol with one atom of magnesium, which is cooled to a temperature of 5° C. The addition only gives off a very little heat and the temperature is easily maintained below 10° C. The additional product is separated under the form of a gelatinous precipitate which is deposited in a flaky mass. When one molecule of oxid of ethylene has been absorbed, the precipitation ceases. 200 cubic centimeters of toluene are then added and the ether is evaporated in a boiling water bath. The primary alcohol is then isolated and purified as in Example I. The p-metoxy-phenyl-B-ethanol is obtained with a good yield, which distils at 121° C. at a pressure of 5 millimeters.

*Example IV. Primary 2-metoxy-cresyl-5-ethylic alcohol.*—By replacing, in Example III, the bromanisol by the 2-metoxy-5-bromo-toluene, the primary 2-metoxy-cresyl-5-ethanol is obtained in the same manner with a good yield. It is a colorless oily liquid with a slight aromatic odor; its density is about 1.1025 at 21° C. Its boiling point at 5 millimeters is from 129 to 130° C. Its phenylid of ethan re-crystallized in the methylic alcohol melts at 118° C.

What I claim and desire to secure by Letters Patent is:—

1. The process for the preparation of the primary phenyl-ethylic alcohol which consists in cooling an ethereal solution of phenyl-bromid of magnesium to a temperature of approximately 0° C., introducing into the said solution a proportion of dry oxid of ethylene in gaseous condition, maintaining the temperature at about 10° C, until all the oxid of ethylene is absorbed, adding a proportion of dry benzene, evaporating the ether, cooling, and finally adding dilute sulfuric acid.

2. In the manufacture of primary alcohols by the Grignard process, the introduction of ethylene oxid in a gaseous state into a solution of an organic magnesium haloid compound in a neutral solvent.

3. In the manufacture of primary alcohols by the Grignard process, the introduction of ethylene oxid in a gaseous state into an ethereal solution of an organic magnesium haloid compound maintained at a temperature of approximately 10° C.

4. In the manufacture of primary alcohols by the Grignard process, the introduction of a molecule of ethylene oxid in a gaseous state into the combination of one molecule of an aromatic bromid with one atom of magnesium, preferably in ethereal solution.

5. The manufacture of primary phenylethylic alcohol by the introduction of one molecule of gaseous ethylene oxid into an ethereal solution of one molecule of phenyl bromid of magnesium at a temperature from 0° to 10° C. hydrolyzing the intermediate compound formed by the addition of a dilute mineral acid, and rectifying of the separated alcohol.

In testimony whereof I have signed my name to this specification.

JEAN ALTWEGG.